US010114502B2

(12) United States Patent
Chen et al.

(10) Patent No.: US 10,114,502 B2
(45) Date of Patent: Oct. 30, 2018

(54) TOUCH PANEL COMPRISING TOUCH ELECTRODES IN TWO AREAS IN WHICH A DISTANCE BETWEEN TWO ADJACENT TOUCH ELECTRODES IN THE FIRST AREA DIFFERS FROM THAT OF THE SECOND AREA

(71) Applicants: INTERFACE OPTOELECTRONIC (SHENZHEN) CO., LTD., Shenzhen (CN); GENERAL INTERFACE SOLUTION LIMITED, Miaoli County (TW)

(72) Inventors: Cheng-Ju Chen, Hsinchu (TW); Yung-Chou Chan, Hsinchu (TW); Yen-Hua Chen, Hsinchu (TW)

(73) Assignees: INTERFACE OPTOELECTRONIC (SHENZHEN) CO., LTD., Shenzhen (CN); GENERAL INTERFACE SOLUTION LIMITED, Zhubei (TW)

( * ) Notice: Subject to any disclaimer, the term of this patent is extended or adjusted under 35 U.S.C. 154(b) by 145 days.

(21) Appl. No.: 15/230,851

(22) Filed: Aug. 8, 2016

(65) Prior Publication Data
US 2017/0045990 A1    Feb. 16, 2017

(30) Foreign Application Priority Data
Aug. 13, 2015   (CN) .......................... 2015 1 0495279

(51) Int. Cl.
*G06F 3/041*     (2006.01)
*G06F 3/044*     (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| 2015/0035761 A1* | 2/2015 | Seo ........................ G06F 3/044 345/173 |
| 2015/0205426 A1* | 7/2015 | Conzola ................ G06F 3/0488 345/173 |

FOREIGN PATENT DOCUMENTS

WO    WO 2015030869 A1 *   3/2015    ........... G06F 1/1626

* cited by examiner

*Primary Examiner* — Abdul-Samad A Adediran
*Assistant Examiner* — Kirk Hermann
(74) *Attorney, Agent, or Firm* — ScienBiziP, P.C.

(57) ABSTRACT

A touch panel includes a first touch area and a second touch area. The first touch area includes a plurality of first sensing electrodes electrically insulated from each other. Every two adjacent first sensing electrodes space apart from each other by a first distance. The second touch area includes a plurality of second sensing electrodes electrically insulated from each other. Every two adjacent second sensing electrodes space apart from each other by a second distance. The second distance is less than the first distance. The first sensing electrodes and at least one second sensing electrode detects for touch operation at different time periods.

12 Claims, 5 Drawing Sheets

TOUCH PANEL COMPRISING TOUCH ELECTRODES IN TWO AREAS IN WHICH A DISTANCE BETWEEN TWO ADJACENT TOUCH ELECTRODES IN THE FIRST AREA DIFFERS FROM THAT OF THE SECOND AREA

CROSS-REFERENCE TO RELATED APPLICATIONS

This application claims priority to Chinese Patent Application No. 201510495279.X filed on Aug. 13, 2015, the contents of which are incorporated by reference herein.

FIELD

The subject matter herein generally relates to a touch panel with function of identifying touch operation.

BACKGROUND

A touch display device, such as a portable touch display device like a cell phone or a tablet computer, normally includes a touch panel. The touch panel increases in size with the enlargement of the display panel. The increasing in size of the touch panel and the display panel leads to a rapid increase in power consumption of the touch display device.

Besides, all areas of the current touch display panel always have a consistent touch resolution. However, different operating environments require different touch resolutions. For example, a higher touch resolution is required in some operating mode, such as a mode of modulating a picture color or a mode of writing with meticulous stylus.

BRIEF DESCRIPTION OF THE FIGURES

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "touch resolution" means the number of touching points in per unit area that can be sensed on a touch panel. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series, and the like.

The present invention provides a touch panel with low power consumption and adjustable touch resolution.

Figure 1:
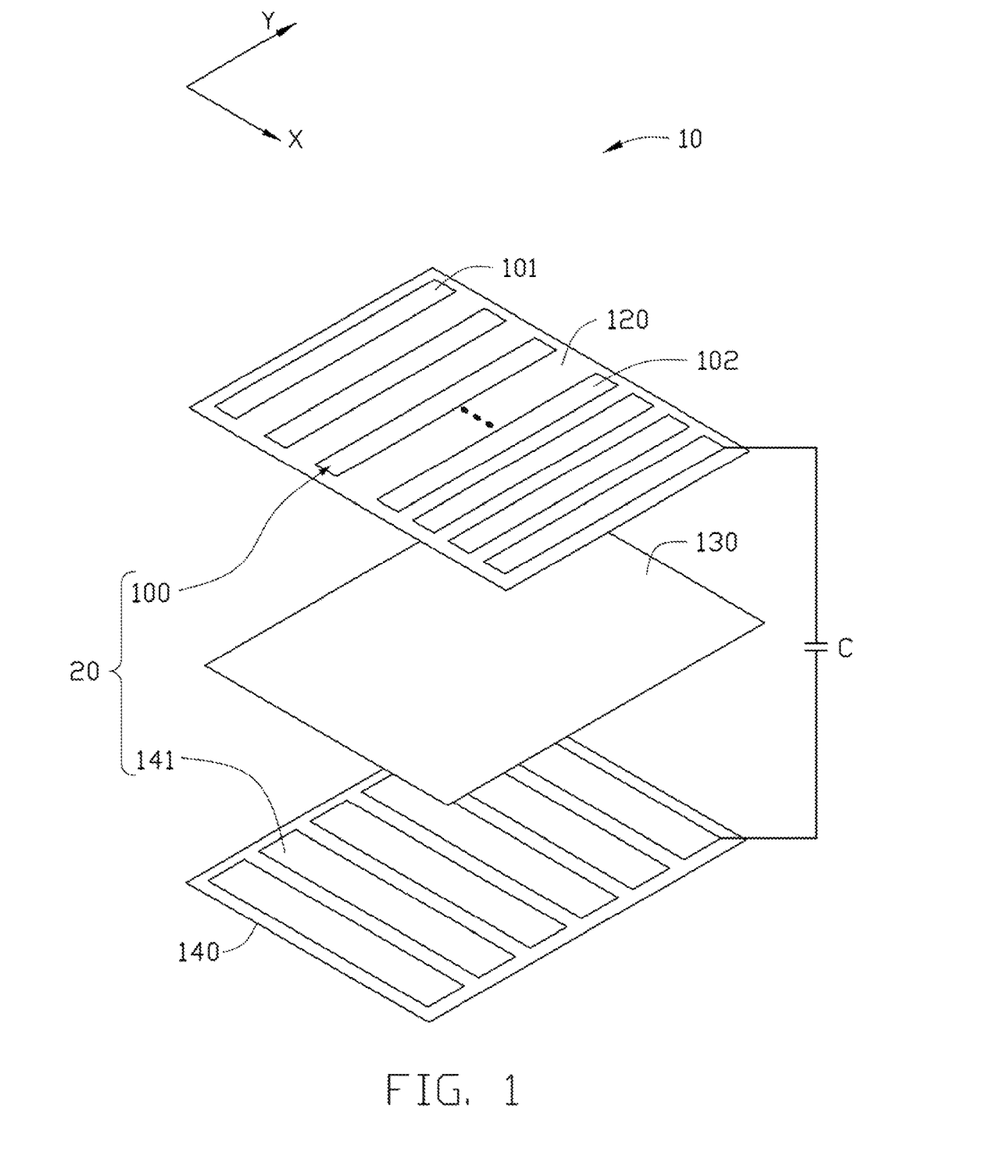
FIG. 1 is an exploded view of a touch sensing structure of a first exemplary embodiment of a touch panel.
Figure 2:
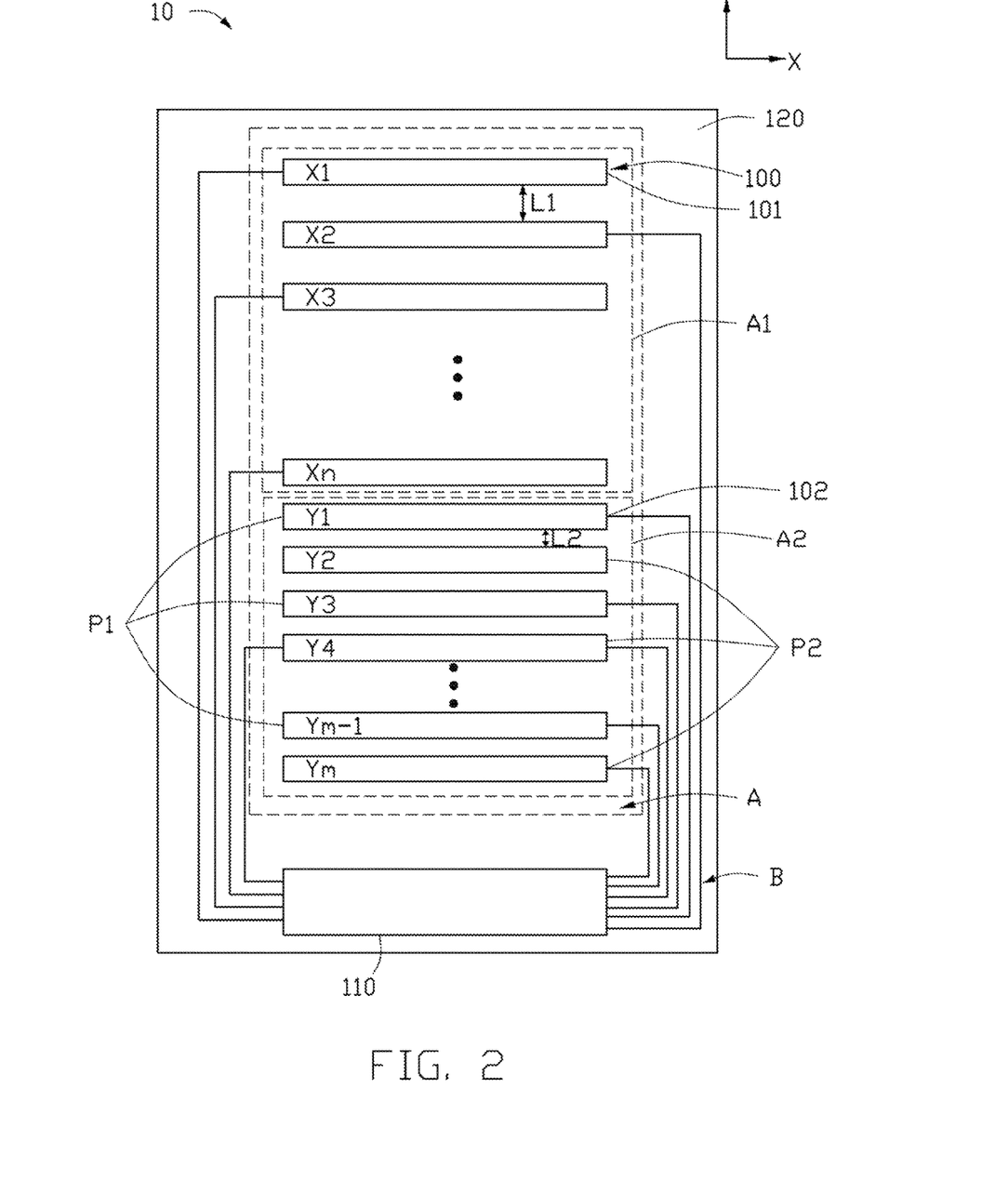
FIG. 2 is a top view of the touch sensing structure of FIG. 1.

FIG. 1 and FIG. 2 show a first exemplary embodiment of a touch panel 10. The touch panel 10 includes a first substrate 120, a second substrate 140, and a touch sensing structure 20 formed on the first substrate 120 and the second substrate 140. The touch panel 10 is positioned between a display panel (not show) and a cover lens (not show). In this exemplary embodiment, the touch panel 10 is manufactured as a glass-film-film (GFF) type capacitance touch panel. In other exemplary embodiments, the structure of the touch panel 10 can be a one glass solution (OGS) structure, a glass-film (GF) structure, a glass-film 2 (GF2) structure or a glass-film-film (GFF) structure. The first substrate 120, the second substrate 140, and the cover lens are made of transparent material like glass or polyethylene terephthalate (PET).

The touch sensing structure 20 is electrically connected to a driving device 110 (showed in FIG. 2). The touch sensing structure 20 cooperates with the driving device 110 to detect a touch operation of a user to acquire touch position information.

The touch sensing structure 20 includes a touch-sensing electrode layer 100 formed on the first substrate 120. An insulating layer 130 can be located between the first substrate 120 and the second substrate 140. The insulating layer 130 may be an optical clear adhesive (OCA) layer.

The touch-sensing electrode layer 100 includes a plurality of first sensing electrodes 101 and a plurality of second sensing electrodes 102. All of the first sensing electrodes 101 and the second sensing electrodes 102 extend along a first direction Y, and are positioned along a second direction X perpendicular to the first direction Y.

The touch sensing structure 20 further includes a plurality of third sensing electrodes 141 formed on the second substrate 140. All of the third sensing electrodes 141 extend along the second direction X, and are positioned along the first direction Y.

Figure 3:
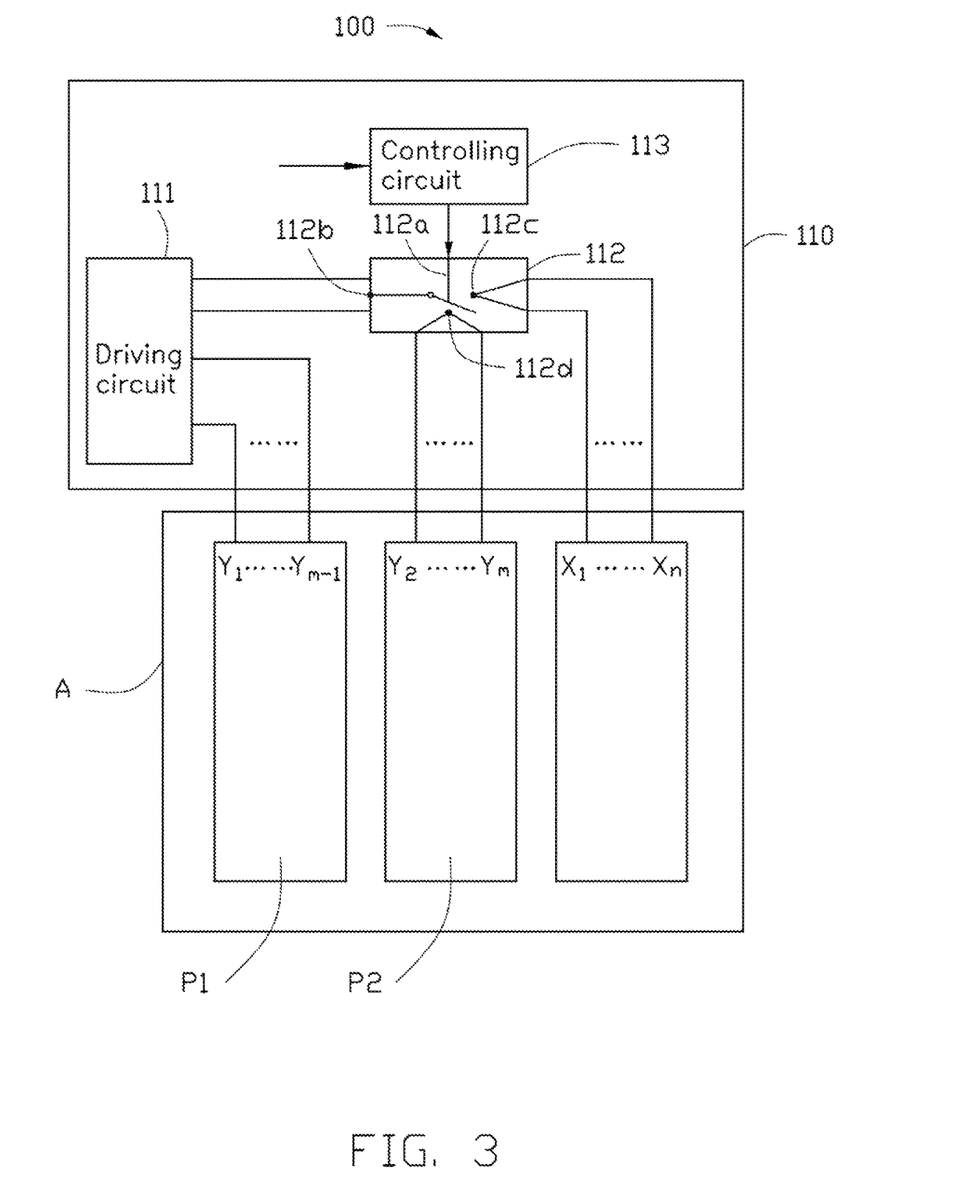
FIG. 3 is a circuit block diagram of a driving device of the touch panel of FIG. 2.

The touch-sensing electrode layer 100 are used as touch driving electrodes (Tx) to receive a driving signal from a driving circuit 111 of the driving device 110 shown in FIG. 3. The third sensing electrodes 141 are used as touch-sensing electrodes (Rx) to send a sensing signal to the driving device 110.

The first sensing electrodes 101 and the second sensing electrodes 102 cooperate, respectively, with the third sensing electrodes 141 to form a plurality of sensing capacitors C (only one sensing capacitors C is shown in FIG. 1). When the first sensing electrodes 101 and the second sensing electrodes 102 receive a driving signal, the third sensing electrodes 141 generate a sensing signal and send to the driving device 110. The driving device 110 analyzes the sensing signal to identify whether the touch sensing structure 20 is touched or not, and then identifies if a touch position exists.

The first sensing electrodes 101, the second sensing electrodes 102, and the third sensing electrodes 141 can be all strip-shaped, wave-shaped, or rhombus-shaped that are connected with each other etc. The first sensing electrodes 101, the second sensing electrodes 102, and the third sensing electrodes 141 can be a mesh-shaped.

The touch panel 10 defines a touch area A and a peripheral area B surrounding the touch area A. Both of the touch-sensing electrode layer 100 and the third sensing electrodes 141 are positioned corresponding to the touch area A. The first sensing electrodes 101 and the second sensing electrodes 102 are positioned in the touch area A and are electrically coupled to the driving device 110 by leads formed in the peripheral area B of the first substrate 120. The third sensing electrodes 141 are also electrically coupled to the driving device 110 by leads (not show) formed in the peripheral area B of the second substrate 140. When used in combination with a display panel (not show), the touch area A of the touch panel 10 corresponds to an image display region of the display panel, and the peripheral area B corresponds to a non-display region of the display panel. The driving device 110 can be positioned on the first substrate 120 or the second substrate 140 and corresponds to the peripheral area B.

The touch area A includes a first touch area A1 and a second touch area A2, and the first touch area A1 is adjacent to the second touch area A2. The first touch area A1 and the second touch area A2 do not overlapped with each other. The first touch area A1 has a first touch resolution, and the second touch area A2 has a second touch resolution different from the first touch resolution. In this exemplary embodiment, the second touch resolution is greater than the first touch resolution.

The first sensing electrodes 101 are positioned corresponding to the first touch area A1 and are electrically insulated from each other. Every two adjacent first sensing electrodes 101 are spaced from each other by a first distance L1, thus the first touch area A1 has a first touch resolution. For illustrative purposes, the first sensing electrode 101 are defined as X1, X2, X3, . . . , Xn, in sequence, wherein n is a natural number greater than 1.

The second sensing electrodes 102 are positioned corresponding to the second touch area A2 and are electrically insulated from each other. Each two adjacent second sensing electrodes 102 are spaced from each other by a second distance L2 less than the first distance L1, thus the first touch area A1 has a second touch resolution. In this exemplary embodiment, the first distance L1 is twice as the second distance L2. For illustrative purposes, the second sensing electrodes 102 are defined as Y1, Y2, Y3, . . . , Ym, in sequence, wherein m is a natural number greater than n mentioned above, such as m is twice as n. The second sensing electrode 102 defined as Y1 is adjacent to the first second sensing electrode 102 defined as Xn. The first sensing electrodes 101 and the second sensing electrodes 102 are arranged in the same column.

Because of the second distance L2 is less than the first distance L1, the touch resolution of the second touch area A2 is greater than the touch resolution of the first touch area A1.

The second sensing electrodes 102 are defined as two groups, a first group P1 and a second group P2, respectively. The second sensing electrodes 102 of the first group P1 and the second sensing electrodes 102 of the second group P2 are alternately arranged. That is, at least one second sensing electrode 102 of the second group P1 is arranged between two adjacent second sensing electrodes 102 of the first group P2.

In this exemplary embodiment, one second sensing electrode 102 of the second group P2 is arranged between two adjacent second sensing electrodes 102 of the first group P1. Specifically, the first group P1 includes the second sensing electrodes 102 defined as Y1, Y3, Y5, . . . , and Ym−1, and the second group P2 includes the second sensing electrodes 102 defined as Y2, Y4, Y6, . . . , and Ym. That is, all of the second sending electrodes 102 are arranged in column, the first group P1 includes all the odd number second sensing electrodes 102 and the second group P2 includes all the even number second sensing electrodes 102

The first sensing electrodes 101 and at least one second sensing electrode 102 do not perform a sensing operation during a same time period. Namely, the first sensing electrodes 101 and at least one second sensing electrode 102 work at different time periods. For example, the first sensing electrodes 101 and the second sensing electrodes 102 of the second group P2 work at different time periods while the first sensing electrodes 101 work at the same time period with the second sensing electrodes 102 of the first group P1. Alternatively, the first sensing electrodes 101 and the second sensing electrodes 102 of the first group P1 work at different time periods while the first sensing electrodes 101 work at the same time period with the second sensing electrodes 102 of the second group P2.

Specifically, under control of the driving device 110, the touch-sensing electrode layer 100 has two working modes, a first working mode and a second working mode, respectively. The number of the second sensing electrodes 102 in the first working mode is less than the number of the second sensing electrodes 102 in second working mode. In this exemplary embodiment, the number of the second sensing electrodes 102 in the first working mode is half of the number of the second sensing electrodes 102 in second working mode.

Specifically, in the first working mode, the first sensing electrodes 101 and the second sensing electrodes 102 of the first group P1 are in a working state to detect a touch operation of a user, and the second sensing electrodes 102 of the second group P2 are in an off state. As such, both of the first touch area A1 and the second touch area A2 are able to detect a touch operation at this same time, and meanwhile, the first touch area A1 and the second touch area A2 have substantially the same touch resolution. In the second working mode, all of the first sensing electrodes 101 are in an off state, and both of the second sensing electrodes 102 of the first group P1 and the second sensing electrodes 102 of the second group P2 are in a working state to detect a touch operation of a user in the second touch area A2.

As showed in FIG. 3, the driving device 110 includes a driving circuit 111, a switching circuit 112, and a controlling circuit 113. The driving circuit 111 outputs a driving signal for detecting a touch operation. In this exemplary embodiment, the driving circuit 111 is electrically connected to the second sensing electrodes 102 of the first group P1, thus the second sensing electrodes 102 of the first group P1 directly receive driving signal from the driving circuit 111.

The switching circuit 112 includes a plurality of control terminals 112a, a plurality of first transmission terminals 112b, a plurality of second transmission terminals 112c, and a plurality of third transmission terminals 112d. The control terminals 112a are electrically connected to the controlling circuit 113, the first transmission terminals 112b are electrically connected to the driving circuit 111, the second transmission terminals 112c are electrically connected to the first sensing electrodes 101, and the third transmission terminals 112d are electrically connected to the second sensing electrodes 102 of the second group P2.

The controlling circuit 113 is used for receiving a mode selecting signal, and exporting a control signal to the control terminals 112a according to the mode selecting signal, then the control terminals 112a control the first transmission terminals 112b to selectively and electrically connect with the second transmission terminals 112c or the third transmission terminals 112d. In this way, the controlling circuit 113 controls the touch-sensing electrode layer 100 to be in the first working mode or in the second working mode. The mode selecting signal may be generated by triggering a mechanical switch by a user, or generated by the driving device 110 according to operating a software application by a user like editing information or operating a game etc.

Specifically, when the first transmission terminals 112b are electrically connected to the second transmission terminals 112c, then all of the first sensing electrodes 101 are electrically connected to the driving circuit 111, and all of the first sensing electrodes 101 receive driving signal from the driving circuit 111. At the same time, the second sensing electrodes 102 of the second group P2 are switched off, and the touch-sensing electrode layer 100 are in the first working mode.

When the first transmission terminals 112b are electrically connected to the third transmission terminals 112d, the second sensing electrodes 102 of the second group P2 are electrically connected to the driving circuit 111, and all of the second sensing electrodes 102 of the second group P2 receive driving signal from the driving circuit 111. At the same time, the first sensing electrodes 101 are all switched off, and the touch-sensing electrode layer 100 are in the second working mode.

The driving circuit 111 includes a plurality of signal transmitting terminals (not show). A number of the signal transmitting terminals no less than a total number of the first sensing electrodes 101 and the second sensing electrodes 102. A signal transmitting terminal is connected to a first sensing electrode 101 or a second sensing electrode 102. The number of the second transmission terminals 112c is equal to the number of the first sensing electrodes 101, the number of the third transmission terminals 112d is equal to the number of the second sensing electrodes 102 of the second group P2

In at least one embodiment, when the number of the first sensing electrodes 101 is different from the number of the second sensing electrodes 102 of the second group P2, the number of the third transmission terminals 112d is no less than either the number of the first sensing electrodes 101 or the number of the second sensing electrodes 102 of second group P2, whichever of the two having a greater number of electrodes.

The touch-sensing electrode layer 100 can choose a working mode between the first working mode and the second working mode depending on the requirement. When the touch-sensing electrode layer 100 chooses the first working mode, the first sensing electrodes 101 and the second sensing electrodes 102 of the first group of P1 are all in a working state. When the touch-sensing electrode layer 100 chooses the second working mode, all of the second sensing electrodes 102 in the second touch area A2 are in a working state, the touch resolution of the second touch area A2 can be high enough to meet the requirement of high touch resolution of the users and low power consumption of a touch panel.

Figure 4:
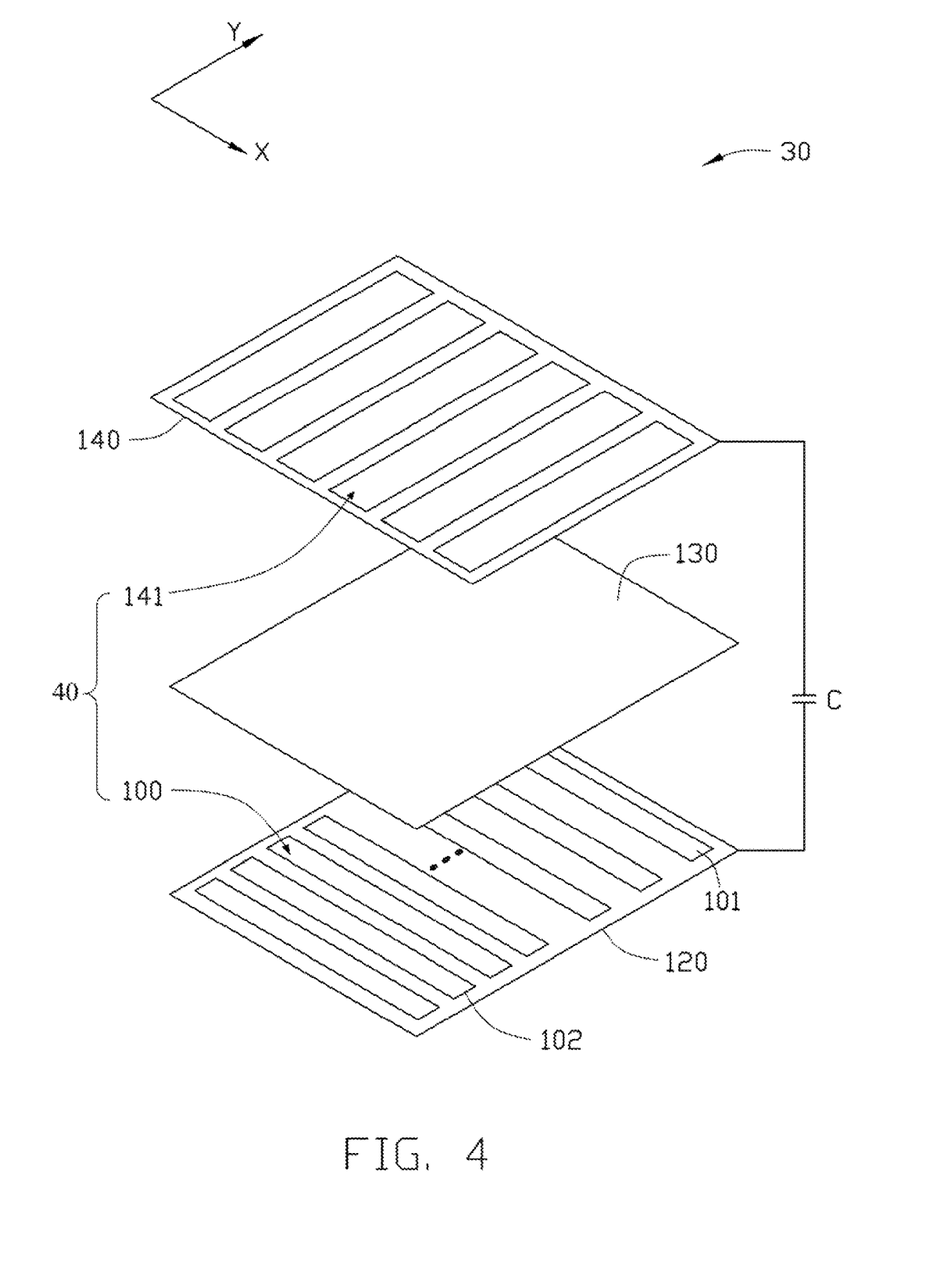
FIG. 4 is an exploded view of a touch sensing structure of a second exemplary embodiment of the touch panel.

FIG. 4 shows an exploded view of a touch sensing structure 40 of a second exemplary embodiment of a touch panel 30. The touch panel 30 of the second exemplary embodiment is similar with the touch panel 10 of embodiment 1, except that a touch sensing structure 40 of the touch panel 30 in this exemplary embodiment is different from the touch sensing structure 20 in the first exemplary embodiment.

Figure 5:
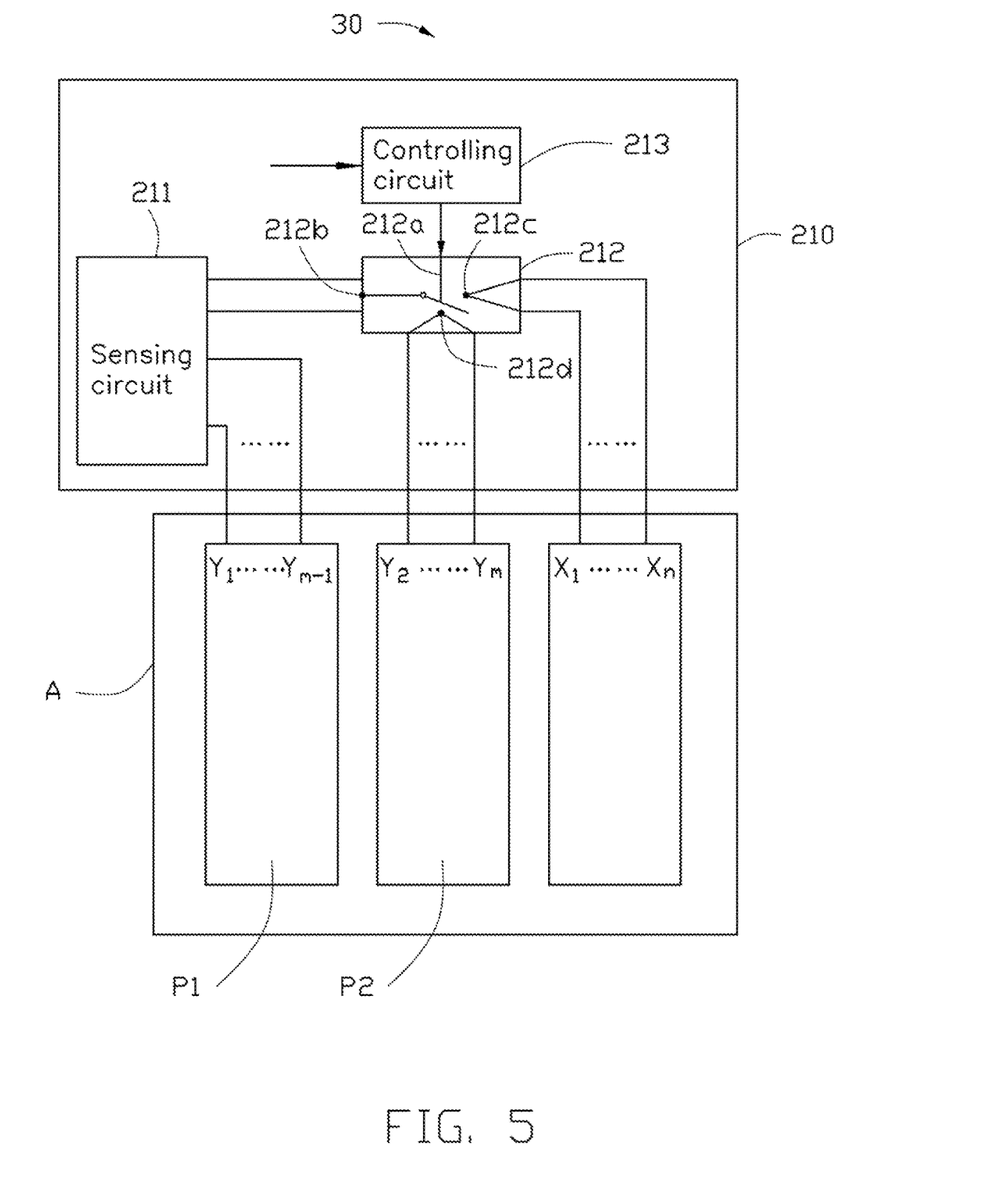
FIG. 5 is a circuit block diagram of a driving device of the touch panel of FIG. 4.

Specifically, the touch panel 30 includes the first substrate 120, the second substrate 140 and the touch sensing structure 40. The touch sensing structure 40 includes the touch-sensing electrode layer 100 formed on the first substrate 120 and the third sensing electrodes 141 formed on the second substrate 140. In this exemplary embodiment, the touch-sensing electrode layer 100 of the touch sensing structure 40 herein are used as touch-sensing electrodes (Rx) to send sensing signal to a sensing circuit 211 of a driving device 210 (showed in FIG. 0.5) instead of receiving a driving signal from a driving circuit 111 (showed in FIG. 0.3), while the third sensing electrodes 141 are used as touch driving electrodes (Tx) to receive a driving signal from a driving circuit (not show) of the driving device 210 instead of sending a sensing signal to the driving device 110 (also showed in FIG. 0.3).

As showed in FIG. 5, the driving device 210 includes a sensing circuit 211, a switching circuit 212, and a controlling circuit 213. The sensing circuit 211 receives a sensing signal for detecting a touch operation. In this exemplary embodiment, the sensing circuit 211 is electrically connected to the second sensing electrodes 102 of the first group P1, thus the second sensing electrodes 102 of the first group P1 directly send sensing signal to the sensing circuit 211.

The switching circuit 212 includes a plurality of control terminals 212a, a plurality of first transmission terminals 212b, a plurality of second transmission terminals 212c, and a plurality of third transmission terminals 212d. The control terminals 212a are electrically connected to the controlling circuit 213, the first transmission terminals 212b are electrically connected to the sensing circuit 211, the second transmission terminals 212c are electrically connected to the first sensing electrodes 101, and the third transmission terminals 212d are electrically connected to the second sensing electrodes 102 of the second group P2.

The controlling circuit 213 is used for receiving a mode selecting signal, and exporting a control signal to the control terminals 212a according to the mode selecting signal, then the control terminals 212a control the first transmission terminals 212b to selectively and electrically connect with the second transmission terminals 212c or the third transmission terminals 212d. Thereby the controlling circuit 213 controls the touch-sensing electrode layer 100 to be in the first working mode or in the second working mode. The mode selecting signal may be generated by triggering a mechanical switch by a user, or generated by the driving device 210 according to operating a software application by a user like editing information or operating a game etc.

Specifically, the first transmission terminals 212b electrically connect to the second transmission terminals 212c makes all of the first sensing electrodes 101 electrically connect to the sensing circuit 211, then all of the first sensing electrodes 101 send sensing signal of a touch operation to the sensing circuit 211. At the same time, the second sensing electrodes 102 of the second group P2 are switched off, and the touch-sensing electrode layer 100 are in the first working mode.

When the first transmission terminals 212b are electrically connected to the third transmission terminals 212d, the second sensing electrodes 102 of the second group P2 are electrically connected to the sensing circuit 211, then all of the second sensing electrodes 102 of the second group P2 send sensing signal to the sensing circuit 211. Meanwhile, the first sensing electrodes 101 are all switched off, and the touch-sensing electrode layer 100 are in the second working mode.

The sensing circuit 211 includes a plurality of signal receiving terminals (not show). A number of the signal receiving terminals no less than a total number of the first sensing electrodes 101 and the second sensing electrodes 102. A signal receiving terminal is connected to a first sensing electrode 101 or a second sensing electrode 102. The number of the second transmission terminals 112c is equal to the number of the first sensing electrodes 101, the number of the third transmission terminals 112d is equal to the number of the second sensing electrodes 102 of the second group P2.

In at least one embodiment, when the number of the first sensing electrodes 101 is different from the number of the second sensing electrodes 102 of the second group P2, the number of the third transmission terminals 212d is no less than either the number of the first sensing electrodes 101 or the number of the second sensing electrodes 102 of second group P2, whichever of the two having a greater number of electrodes.

The touch-sensing electrode layer 100 can choose a working mode between the first working mode and the second working mode depending on the requirement. When the touch-sensing electrode layer 100 chooses the first working mode, the first sensing electrodes 101 and the second sensing electrodes 102 of the first group of P1 are all in a working state. When the touch-sensing electrode layer 100 chooses the second working mode, all of the second sensing electrodes 102 in the second touch area A2 are in a working state, the touch resolution of the second touch area A2 can be high enough to meet the requirement of high touch resolution of the users and low power consumption of a touch panel.

While various exemplary and preferred embodiments have been described, the disclosure is not limited thereto. On the contrary, various modifications and similar arrangements (as would be apparent to those skilled in the art) are intended to also be covered. Therefore, the scope of the appended claims should be accorded the broadest interpretation so as to encompass all such modifications and similar arrangements.

What is claimed is:

1. A touch panel comprising:
   a first touch area comprising a plurality of first sensing electrodes electrically insulated from each other, every two adjacent first sensing electrodes being spaced from each other by a first distance; and
   a second touch area comprising a plurality of second sensing electrodes electrically insulated from each other, every two adjacent second sensing electrodes being spaced from each other by a second distance;
   wherein the second distance is less than the first distance;
   wherein the first sensing electrodes and at least one of the second sensing electrodes detect for touch operation at different time periods;
   wherein the first distance is twice the second distance;
   wherein the touch panel comprises a first working mode and a second working mode; wherein in the first working mode, all of the first sensing electrodes and at least one of the second sensing electrodes is in work; wherein in the second working mode, all of the second sensing electrodes are in work, and all of the first sensing electrodes are in an off state;
   wherein a number of the second sensing electrodes in the first working mode is less than a number of the second sensing electrodes in the second working mode;
   wherein the second sensing electrodes are defined as a first group and a second group, and the second sensing electrodes of the first group and the second sensing electrodes of the second group are alternately arranged;
   wherein only one second sensing electrode of the second group is arranged between every two adjacent second sensing electrodes of the first group;
   and wherein all of the second sending electrodes are arranged in a column, the first group comprises all odd number second sensing electrodes and the second group comprises all even number second sensing electrodes; wherein in the first working mode, all of the second sensing electrodes of the first group or all of the second sensing electrodes of the second group are in work.

2. The touch panel of claim 1, wherein the number of the second sensing electrodes in the first working mode is half of the number of the second sensing electrodes in the second working mode.

3. The touch panel of claim 1, further comprising a driving circuit, a controlling circuit, and a switching circuit; wherein the driving circuit outputs a driving signal, the driving circuit is electrically connected to the second sensing electrodes of the first group; wherein the switching circuit is electrically connected to the driving circuit and the controlling circuit; wherein the controlling circuit exports a control signal to control the switching circuit, the switching circuit controls the driving circuit to selectively and electrically connect to the first sensing electrodes or the second sensing electrodes of the second group, thereby the first sensing electrodes and the second sensing electrodes of the second group detect for touch operation at different time periods.

4. The touch panel of claim 3, wherein in the first working mode, the controlling circuit controls the driving circuit to electrically connect with the first sensing electrodes; and wherein in the second working mode, the controlling circuit controls the driving circuit to electrically connect with the second group of second sensing electrodes.

5. The touch panel of claim 3, wherein the first sensing electrodes and the second sensing electrodes are a plurality of touch driving electrodes, and the touch driving electrodes receive a driving signal from the driving circuit.

6. The touch panel of claim 1, wherein the touch panel further comprises a sensing circuit, a controlling circuit, and a switching circuit; wherein the sensing circuit receives a driving signal, the sensing circuit is electrically connected to the second sensing electrodes of the first group; wherein the switching circuit is electrically connected to the sensing circuit and the controlling circuit; wherein the controlling circuit sends a control signal to control the switching circuit; wherein the switching circuit controls the sensing circuit to selectively and electrically connect to the first sensing electrodes or the second sensing electrodes of the second group, thereby the first sensing electrodes and the second sensing electrodes of the second group detect for touch operation at different time periods.

7. The touch panel of claim 6, wherein in the first working mode, the controlling circuit controls the sensing circuit to electrically connect to the first sensing electrodes; wherein in the second working mode, the controlling circuit controls the sensing circuit to electrically connect to the second group of second sensing electrodes.

8. The touch panel of claim 6, wherein the first sensing electrodes and the second sensing electrodes are a plurality of touch sensing electrodes, and the touch sensing electrodes send a driving signal to the sensing circuit.

9. The touch panel of claim 1, wherein the touch panel comprises a touch area and a peripheral area surrounding the touch area, the touch area comprises the first touch area and the second touch area.

10. The touch panel of claim 1, wherein the first sensing electrodes and the second sensing electrodes are strip shaped.

11. The touch panel of claim 10, wherein the first sensing electrodes and the second sensing electrodes extend along a first direction and are positioned along a second direction perpendicular to the first direction.

12. The touch panel of claim 11, further comprising a plurality of third sending electrodes electrically insulated from the first sensing electrodes and the second sensing electrodes; the third sensing electrodes are strip shaped and extend along the second direction.

* * * * *